March 22, 1960  L. M. ERICSSON  2,929,077
CONNECTION BETWEEN THE FRAME AND SPRING OF FURNITURE
Filed Jan. 25, 1957

INVENTOR
LARS MAGNUS ERICSSON

BY *A. Yates Dowell*

ATTORNEYS

United States Patent Office 2,929,077
Patented Mar. 22, 1960

2,929,077

CONNECTION BETWEEN THE FRAME AND SPRING OF FURNITURE

Lars Magnus Ericsson, Nykoping, Sweden

Application January 25, 1957, Serial No. 636,263

2 Claims. (Cl. 5—260)

My invention relates to a device for pivotally securing prearched sinuous or zigzag spring members to frame members as for example in a piece of furniture.

More particularly my invention relates to a device for individually and pivotally securing the ends of a plurality of spaced and parallel pre-arched U-shaped or zigzag spring strips extending to substantially parallel tubular members forming opposite lateral sides of a steel tube frame of a piece of furniture, particularly a bed.

One main object of my invention is to provide a securing device for spring constructions comprising spring strips and tubular frame members of the type set forth above preventing disturbing noises from being created in the connection zones between said tubular frame members and said spring strips.

A further object of my invention is to provide a securing device for spring constructions comprising spring strips and frame members of the type set forth making it possible to dispense with separate bearing members rigidly connected to said tubular frame members and adapted pivotally to receive the ends of said spring strips.

A still further object of my invention is to provide a securing device for spring constructions comprising spring strips and tubular frame members of the type set forth making it possible to anchor the ends of said spring members within said tubular frame members in a simple and cheap and nevertheless reliable manner and also to allow easy assemblage of the spring construction.

Further objects and advantages of the invention will become apparent from the following description considered in connection with the accompanying drawing which forms part of this specification and of which:

Figure 1:
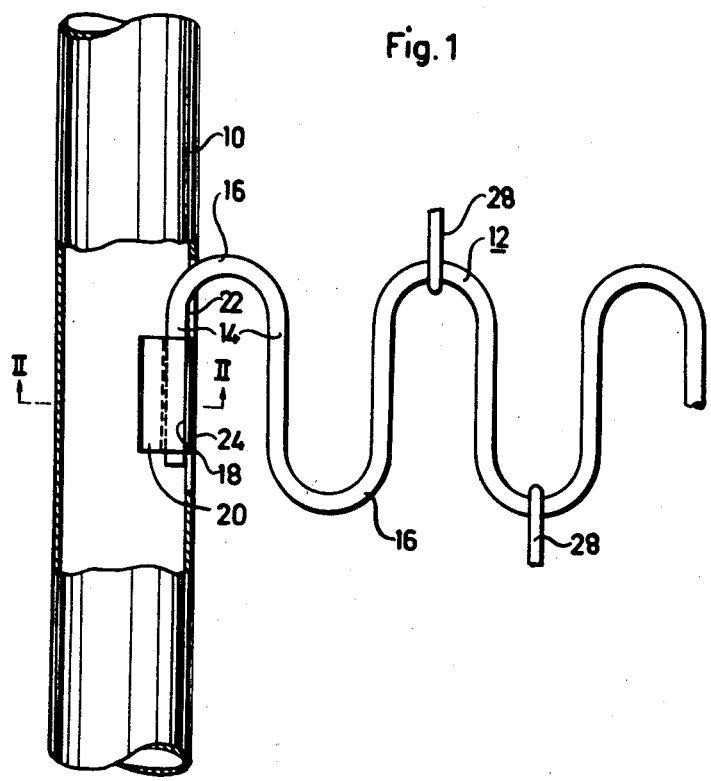
Fig. 1 is a partial longitudinal section of a portion of a frame member of a rectangular frame composed of steel tubes and zigzag spring members pivotally connected thereto in a manner embodying the invention.

Referring to the drawing, 10 denotes a portion of a tubular frame member which in the present case is intended to be a part of the rectangular steel tube frame of a bed. A plurality of spaced spring strips 12 of the sinuous or zigzag type are in spaced and parallel relationship stretched between two longish and parallelly spaced frame members 10 and pivotally secured with one of their ends to one and with the other end to the other of said frame members. Said spring strips are made of spring wire arched so as to form spaced rectilinear legs 14 joined by arched portions 16 which face in opposite lateral directions in adjacent loops, said loops substantially extending in the plane of the rectangular frame.

Pivotal connection between the frame members 10 and the spring strips 12 is made by introducing the extremities of the rectilinear legs 14 into bores 18 formed in bearing elements 20 which together with said end portions are introduceable through openings or slots 22 provided in the tubular frame members 10 and facing the interior of the frame and extending in the longitudinal direction of the frame member. Said bearing elements may be made of brass, bronze, plastic or similar material not causing any disturbing noise when sliding or otherwise moved in contact with portions of the frame tubes and the springs. The longitudinal edges of said slots 22 constitute guides for a shoulder 24 projecting from and preferably constituting one piece with the bearing element 20 and formed as a longitudinal ridge or rib the length of which is less than that of the slot 22 and the breadth of which is slightly less than the width of said slot. The bearing element 20 has on both sides of the ridge 24 outwardly directed portions 26 which may have the shape of wings following the interior curvature of the tube and preventing the bearing element when mounted to be drawn out through the slot 22. The through bores 18 engaged by the end portions 14 of the spring strips extend in the longitudinal direction of and are situated adjacent said ridge 24.

Figure 2:
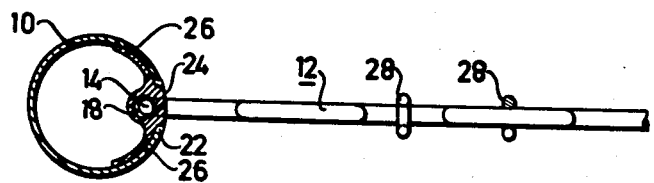
Fig. 2 is a section following line II—II of Fig. 1.

When establishing the above described pivotal connection between the frame members 10 and the spring strips 12 which means when attaching said strip to the frame the bearing element 20 is turned so as substantially to coincide with the plane of the spring strip whereupon it is introduced together with the spring strip end through the slot 22. The spring strips for the spring construction in consideration are pre-arched following an arch having a considerably less radius of curvature than in the spring strips after assemblage for which reason in the assembled position a considerable contractive force acting in the longitudinal direction of each spring strip causes the bearing elements 20 after introduction through the slot 22 to take the position shown in Fig. 2 in which position the bearing element is locked relatively to the frame.

There is some slight possibility that the spring strips with the arched portion 16 adjacent the rectilinear portion 14 engaging the bore 18 of the bearing element will come into contact with the front edges of the slot 22. This contact is avoided by interposing in known manner between pairs of spaced spring strips fixing wires provided with hooked portions at both ends which engage adjacent opposite arched portions 16. Securing wires of said kind are indicated at various places in the drawing by reference numeral 28.

As will be readily understood from the aforesaid the engaging ends 14 of the spring strips as well as the bearing elements 20 the ridges 24 of which have a height not surpassing the thickness of the wall of the tubes 10 will not project over the external surface of said tubes which feature ensures that bed equipment supported by the spring construction will not be damaged.

While one more or less specific embodiment of my invention has been described, it is to be understood that this is for purpose of illustration only and that my invention is not to be limited thereby, but its scope is to be determined by the appended claims.

What I claim is:

1. A furniture spring connection device comprising a tubular member having a longitudinal slot through the wall providing an opening into the interior thereof, a spring member having an end portion bent transversely of its length, a bearing member having a thickness less than the width of said slot longitudinally mounted within the interior of said tubular member extending along said slot, said bearing member having a rib portion extending lengthwise of and seated in the slot and extending outwardly toward the exterior surface of the tubular member, the width of the rib portion being slightly less than the width of the slot substantially to fill the occupied width thereof, wing portions connected to said bearing member and extending on opposite sides of said slot and along the interior of the tubular member retaining said bearing member in the tubular member, the bearing member having a hollow portion located within the interior of the tubular member and extending the length of the bearing member pivotally retaining in use the transversely bent end of said spring member within the tubular member and providing a bearing surface for the end of the spring member, portions of the bearing member being of less length than the slot to accommodate the insertion of the end portion of the spring into the tubular member and said hollow portion.

2. The structure of claim 1 in which the bearing element is of a thickness less and of a width greater than the width of said slot to allow insertion of the bearing element into said tubular member through said slot and be turned to form a bridge across said slot.

References Cited in the file of this patent
UNITED STATES PATENTS

| | | |
|---|---|---|
| 1,926,089 | Forbes | Sept. 12, 1933 |
| 2,078,396 | MacEwan | Apr. 27, 1937 |
| 2,622,663 | Burd | Dec. 23, 1952 |
| 2,702,588 | Zummach | Feb. 22, 1955 |